Patented Sept. 21, 1954

2,689,848

UNITED STATES PATENT OFFICE 2,689,848

SALTS OF SULFURIC ACID ESTERS OF XYLAN

Elfriede Husemann, Freiburg im Breisgau, and Otto Westphal and Botho Kickhöfen, Sackingen (Baden), Germany, assignors to Dr. A. Wander A. G., Bern, Switzerland No Drawing. Application February 5, 1952, Serial No. 270,112

Claims priority, application Switzerland February 6, 1951

9 Claims. (Cl. 260—234)

The present invention relates to a process for the production of synthetic anti-coagulants, and particularly to a process for the production of alkali salts of sulfuric acid esters of xylan of improved therapeutic value.

It is well known that heparin has been widely used as an anti-coagulant in the treatment of thromboses and embolisms for many years. However, while this material has given satisfactory therapeutic results in the majority of cases, it is extremely difficult to produce and its cost has severely limited its application. Therefore, there has been a considerable demand for the availability of a product having the properties of heparin, but which can be manufactured at a cost which would make it more available for wider use.

Investigators in this field have long been experimenting with polysulfuric acid esters of polysaccharides in an attempt to produce a product having the physiological properties of heparin; however, all of the products thus produced have either been too ineffective for use as anti-coagulants, or, if they possess anticoagulant properties of a sufficient degree, they have been found so toxic as to prevent their use clinically.

One particular group of compounds, namely the sulfuric acid esters of xylan, have been found to approximate the action of heparin most nearly. However, it was subsequently discovered that even those compounds possess undesirable side effects which render them unsuitable for clinical use, in that they produce an agglutination of blood platelets in the swollen blood vessels, which could lead to dangerous thromboses therein, as well as an undesirable precipitation of fibrinogen.

It is, therefore, an object of our invention to produce salts of the sulfuric acid esters of xylan which do not have the above-mentioned drawbacks and which could, therefore, be used freely in the treatment of thromboses and embolisms.

It was already known that there is a certain relationship between the toxicity of the sulfuric acid esters of polysaccharides and their molecular size and configuration. It was found by E. Husemann and her coworkers (Zf. f. Naturforsch. 1, 584, 1946) that the best therapeutic index was possessed by the sulfuric acid esters of xylan and it was found that the optimum products were those having so-called $Z\eta$ viscosity values between 0.0138 and 0.0201.

$$Z\eta = \frac{\eta_{sp}/C}{1+(K\eta \cdot \eta_{sp})}$$

A modified Staudinger formula wherein $K\eta=0.3$, $\eta_{sp}$=specific viscosity, and $C$=concentration (G. V. Schulz and F. Blaschke J. Prakt. Chem. 158, 130, 1941). Nevertheless, it was subsequently found that even these products have undesirable side effects such as precipitation of fibrinogen when used in therapeutic doses.

The value of $Z\eta$ is proportional to the degree of polymerization (Staudinger, Oregen. Kolloidchemie, third edition Vieweg, Braunschewig 1950) and, consequently, serves as an index of the molecular weight or length of the chain of the xylan sulfuric acid esters.

It has now been unexpectedly found that salts of sulfuric acid esters of xylan can be obtained which not only have high therapeutic activity, but also do not cause precipitation in plasma and have no other undesirable side effects. The products in accordance with the invention are characterized by a very uniform degree of polymerization, $Z\eta$ values between about 0.015 and 0.0030 and a sulfur content of 13.5 to 17% and are obtained by the oxidative depolymerization of salts of highly polymerized highly sulfurized sulfuric acid esters of xylan, for example, those having $Z\eta$ values between 0.031 and 0.034 and a sulfur content between 17.5% and 19%. Preferably the oxidative depolymerization is carried out under acid conditions, as it was found that it simultaneously effects a destruction of the toxic accompanying substances and substantially increases the tolerance of the products obtained, especially those having $Z\eta$ values above 0.0075. Consequently, an acid oxidative depolymerization is preferred when products are to be produced having $Z\eta$ values above 0.0075. These products are of special advantage as they not only possess excellent anticoagulant properties, but also have a longer period of action in vivo. The products according to the invention having $Z\eta$ values between 0.0075 and 0.0030 are also preferably prepared by acid oxidative depolymerization of high molecular weight salts of sulfuric acid esters of xylan, but it is also possible to produce them by oxidative depolymerization in a neutral aqueous medium. The oxidative depolymerization can also be assisted by the addition of catalytic heavy metal ions such as Fe, Cu and Mn in the form of their soluble salts and it is sometimes preferable to control the pH during the oxidative depolymerization by the addition of a buffer. The sulfur content of the depolymerized products according to the invention can be controlled as in oxidative decomposition under neutral conditions, essentially only depolymerization occurs while the degree of esterification remains substantially unchanged, whereas in acid oxidative decomposition the ester sulfur content is diminished by saponification depending upon the quantity of acid added.

It has been found according to the invention that the anticoagulative action of sulfuric acid esters of xylan increases with a constant chain length of the xylan ester with increased esterification from about 13.5% sulfur control (equivalent to poly (xylose monosodium sulfate)) to about 17% sulfur content, but that the tolerance decreases with increasing sulfur content from about 13.5% to about 19% (equivalent to poly (xylose disodium sulfate)). With reference to the anticoagulative activity and tolerance, it has, for example, been found that a sodium salt of a sulfuric acid ester of xylan having a $Z\eta$ value of 0.00725 and an ester sulfur content of about 13.5% is about the equivalent of the products having a $Z\eta$ value of 0.0032 and an ester sulfur content of 17.5%. Such preparations, however, differ from each other in view of the more than 100% difference in degree of polymerization in the time they are retained by the organism and, consequently, in the duration of their action.

The oxidizing agent preferably employed according to the invention is hydrogen peroxide and temperatures between 20° and 100° C. can be employed for the oxidative depolymerization.

The desired products are recovered from the depolymerized product by dialysis to remove the lower molecular weight decomposition products whose $Z\eta$ values are below 0.003 followed by precipitation by the introduction of water miscible organic solvents such as acetones, low molecular weight alcohols or mixtures thereof. The precipitate salt is then dissolved in water and the solution is successively treated with a water miscible organic solvent, the first fractions are separated off by permitting the solids to settle or by centrifuging and the final product with the desired $Z\eta$ value is precipitated out with acetone or alcohol.

The following examples will serve to illustrate the invention.

*Example 1*

1300 cc. pyridine are added, drop by drop, to 300 cc. chlorosulfonic acid, while constantly stirring and cooling the solution to 30–40° C. This mixture is then heated to 65° C. and 150 grams xylan are added thereto. While being constantly stirred, the viscous solution is maintained at 80° C. for 2½ hours, then allowed to flow into 4 liters of methanol with simultaneous vigorous agitation. The precipitated pyridine salt is separated by filtration, dissolved in 800 cc. water, if necessary filtered again, and then allowed to stand for 12 hours after adding 400 cc. of 5% chlorine dioxide solution. Subsequently, this solution is allowed to flow into a mixture of 4.8 liters methanol and 250–300 cc. of 33% sodium hydroxide, stirring constantly, so that the solution is always alkaline to phenolphthalein. The solution is then adjusted to pH 6 by addition of 40 cc. concentrated acetic acid. The resulting pure white salt is isolated by filtration, washed with methanol, acetone and ether, and finally dried at 50° C. The yield of salt thus recovered is 330–350 grams, with a $Z\eta$ value of 0.031–0.034, and a sulfur content of about 17.5–18.5%.

200 grams of this sulfuric acid ester salt of xylan is then dissolved in 590 cc. of warm water and then heated to 97° C. in a water bath. While agitating this solution, 8.16 cc. of 5n $H_2SO_4$ and 100 cc. of 33% $H_2O_2$, which has been preheated to 80° C. are added. The solution is maintained at 97° C. for 30 minutes, then rapidly cooled. For the purpose of neutralization 70–75 cc. of 5n NaOH are then added, and the resulting light-yellow solution is then decolorized with a few drops of chlorine dioxide solution.

This solution is dialyzed against distilled water in suitable cellophane tubes until the outer water shows a negative sulfate reaction; the dialyzate can, if necessary, be cleared of slight cloudiness by means of a filtration. Then the dialzyate is concentrated to 200 cc. under vacuum at 45° C., and the low polymerized salt is precipitated in 800 cc. of a 1:1 alcohol acetone mixture through addition of a small amount of sodium acetate. The yield is 70–80 grams, $Z\eta$ value is 0.00422, sulfur content is 15–15.5%.

186 grams of the dialyzed product are then dissolved in 512 cc. water, the pH of this solution is adjusted to between 3 and 6, and finally 290 cc. acetone are added while stirring slowly, the solution becomes turbid. After the precipitate has been either removed by centrifuging or by allowing the precipitate to settle out and then decanting the clear solution, the latter is treated first with 20 cc. acetone, then (beginning at the point of turbidity) again treated with 25 cc. acetone, and the oily fractions ($Z\eta=0.00528$ and 0.00481) are removed. The remaining solution is poured into a mixture of 1250 cc. alcohol and 750 cc. acetone, the precipitated produce is then separated, washed with alcohol, acetone and ether and then dried at 50° C. The yield is 110–120 grams in the form of a pure white powder, $Z\eta$ value is 0.00422. This $Z\eta$ value represents a medium value of the following limits: upper limit $Z\eta=0.0048$, lower limit $Z\eta=0.0034$, with a sulfur content of 15–15.5%.

*Example 2*

200 grams of the sodium salt of the sulfuric acid ester of xylan ($Z\eta=0.031$–0.034, sulfur content 17.5–18.5%) such as prepared in Example 1, is dissolved in 590 cc. warm water and heated to 97° C. in a water bath. While agitating this solution, 8.93 cc. of 5n $H_2SO_4$ and 100 cc. of 33% $H_2O_2$, which has been preheated to 80° C., are added, the mixture is held at 97° C. for 25 minutes, then rapidly cooled. 100 cc. 5n NaOH are then added for neutralization. After dialysis and precipitation as in Example 1, 65–75 grams of the product is obtained having a $Z\eta$ value of 0.00710 and an ester sulfur content of 13.5–14%. This material can then be further treated through fractionation with organic solvents as in Example 1.

*Example 3*

100 grams of a sodium salt of the sulfuric acid ester of xylan ($Z\eta=0.031$–0.034) are dissolved in 330 cc. of a N/10 solution of sodium acetate with application of heat. After the solution reaches 90° C., 35 cc. of 33% $H_2O_2$ are added. The reaction is interrupted after 60 minutes. After direct precipitation and drying, the yield is 85–95 grams of a product with $Z\eta$ value$=0.0058$ and an ester sulfur content of 17–17.5%. This product can then be further treated by means of dialysis and fractionation with organic solvents as in Example 1.

*Example 4*

55 grams of a sodium salt of the sulfuric acid ester of xylan ($Z\eta=0.031$–0.034) are dissolved in water, 14.5 cc. of a solution of a salt of trivalent iron containing 2% Fe are added together with 16.7 cc. of 30% $H_2O_2$, and the solution is diluted to 236 cc. with water. This mixture is maintained for 180 minutes at 37° C. and yields, after precipitation and drying, 45–50 grams of a salt with $Z\eta$ value 0.00607 and a sulfur content of 17%. This product can then be further treated by means of dialysis and fractionation as in Example 1.

*Example 5*

200 grams of a sodium salt of a sulfuric acid ester of xylan ($Z\eta=0.031$–$0.034$, sulfur content 17.5–18.5%) are dissolved in 505 cc. water. The solution is heated to 82° C. in a thermostatically controlled vessel and then 135 cc. of 2n $H_2SO_4$ and 50 cc. of 30% $H_2O_2$ (both preheated to 82° C.) are added. After allowing the reaction to proceed for 40 minutes the solution is rapidly cooled and then neutralized with about 90 cc. of 5n NaOH. After dialysis and, if necessary, filtration, the volume of the solution is reduced to 200 cc. under vacuum at 45° C. The depolymerized product is then precipitated in 800 cc. of a 1:1 alcohol acetone mixture with addition of a small amount of sodium acetate. The yield is 100 grams of a salt having a $Z\eta$ value of 0.0070, and an ester sulfur content of 14.7–15.0%. 95 grams of this product are dissolved in 260 cc. of water. After adjusting the pH of this solution to between 3 and 6, 200 cc. acetone are slowly added while constantly stirring, a preliminary fraction is thus precipitated in an oily state and is separated. To the remaining clear solution 110 cc. acetone are added, after which the principal fraction precipitates in an oily state. After separating the oily precipitation from the clear solution, the product is precipitated out with an acetone alcohol mixture, washed with acetone and ether, and then dried. The yield is 50–60 grams of a salt having a $Z\eta$ value=0.0076 and an ester sulfur content of about 15%.

*Example 6*

200 grams of a sodium salt of sulfuric acid ester of xylan are treated for 28 minutes at 82° C. in the same manner as in Example 1. After cooling the solution is neutralized with 80 cc. of 5n NaOH, dialyzed, and reduced to a smaller volume in vacuum. Subsequently, the salt is precipitated in an alcohol acetone mixture under addition of a small amount of sodium acetate. The yield is 120 grams, $Z\eta$ value=0.0093, ester sulfur content is about 15.5%. By means of an acetone fractionation of the weakly acid solution 75 grams of uniform product can be obtained. The product has a $Z\eta$ value=0.00965 and an ester sulfur content of about 15.5%.

*Example 7*

200 grams of the sodium salt of xylan ester are treated as in Example 1 at 82° C. for 22 minutes. After cooling and neutralization with 75 cc. of 5n NaOH, dialysis, concentration under vacuum, precipitation in the alcohol acetone mixture and drying, 130 grams of a product having a $Z\eta$ value=0.0116 and an ester sulfur content of about 16% were obtained. By subsequent acetone fractionation 75–90 grams of a uniform product can then be obtained. The $Z\eta$ value of this product equals 0.0124 and it has an ester sulfur content of 16.0%.

*Example 8*

200 grams of a sodium salt of xylan ester are treated as in Example 1 at 82° C. for 16 minutes. After cooling and neutralization with 70 cc. of 5n NaOH, dialysis, concentration under vacuum, precipitation in the alcohol acetone mixture and drying 135–140 grams of a salt having $Z\eta$ value of 0.0145 and an ester sulfur content of about 16.7% were obtained. By further acetone fractionation it is possible to obtain 75–90 grams of a product which is uniform, has a $Z\eta$ value of 0.0150 and an ester sulfur content of about 16.5%.

We claim:

1. In a process for the production of salts of sulfuric acid esters of xylan having high anticoagulant action on blood and low toxicity, the steps which comprise oxidizing an aqueous solution of a salt of a sulfuric acid ester of highly polymeric xylan in an aqueous solution of hydrogen peroxide to depolymerize such highly polymeric xylan ester partially, dialyzing the depolymerized product and fractionating an aqueous solution of the dialyzate with an organic water misicble solvent to obtain a fraction having a $Z\eta$ value between 0.0030 and 0.015 and a sulfur content of 13.5% to 17%.

2. The process according to claim 1, in which said oxidation is carried out in the presence of a salt of a strong base and a weak acid as a buffer.

3. The process according to claim 1, in which said oxidation is carried out in the presence of sodium acetate as a buffer.

4. The process according to claim 1, in which said oxidation is carried out in the presence of a catalytically acting heavy metal ion selected from the group consisting of Fe, Cu and Mn ions.

5. In a process for the production of salts of sulfuric acid esters of xylan having high anticoagulant action on blood and low toxicity, the steps which comprise oxidizing an aqueous solution of a salt of a sulfuric acid ester of highly polymeric xylan in an acidified aqueous solution of hydrogen peroxide to depolymerize such highly polymeric xylan ester partially and saponifying such highly polymeric xylan salt partially, dialyzing the depolymerized product and fractionating an aqueous solution of the dialyzate with an organic water miscible solvent to obtain a fraction having $Z\eta$ value between 0.0030 and 0.015 and a sulfur content of 13.5% to 17%.

6. In a process for the production of salts of sulfuric acid esters of xylan having high anticoagulant action on blood and low toxicity the steps which comprise oxidizing an aqueous solution of an alkali metal salt of a sulfuric acid ester of highly polymeric xylan having a $Z\eta$ value of about 0.031 to 0.034 and an ester sulfur content of about 17.5%–19% in an aqueous solution of hydrogen peroxide to depolymerize such highly polymeric xylan ester partially, dialyzing the depolymerized product in an aqueous medium to remove the fractions of the lower molecular weight, and fractionating an aqueous solution of the dialyzate with an organic water miscible solvent to obtain a fraction having a $Z\eta$ value between 0.0030 and 0.015 and a sulfur content of 13.5% to 17%.

7. In a process for the production of salts of sulfuric acid esters of xylan having high anticoagulant action on blood and low toxicity the steps which comprise oxidizing an aqueous solution of an alkali metal salt of a sulfuric acid ester of highly polymeric xylan having a $Z\eta$ value of about 0.031 to 0.034 and an ester sulfur content of about 17.5%–19% in an acidified aqueous solution of hydrogen peroxide to depolymerize such highly polymeric xylan ester salt partially, dialyzing the depolymerized product in an aqueous medium to remove the fractions of lower molecular weight, and fractionating an aqueous solution of the dialyzate with an organic water miscible solvent to obtain a fraction having a $Z\eta$ value between 0.0030 and 0.015 and a sulfur content of 13.5% to 17%.

8. A process for the production of sodium salt of sulfuric acid esters of xylan having a high anticoagulant action on blood and low toxicity which comprises oxidizing an aqueous solution of a sodium salt of sulfuric acid esters of highly polymeric xylan having a $Z\eta$ value of about 0.031 to 0.034 and an ester sulfur content of about 17.5% to 19.5% in an aqueous solution of hydrogen peroxide to depolymerize such highly polymeric xylan ester partially, dialyzing the depolymerized product in an aqueous medium to remove the fractions of lower molecular weight and fractionating an aqueous solution of the dialyzate with a water miscible organic solvent to obtain a fraction having a $Z\eta$ value between 0.0030 and 0.015, and a sulfur content of 13.5% to 17%.

9. A process for the production of sodium salt of sulfuric acid esters of xylan having a high anticoagulant action on blood and low toxicity which comprises oxidizing an aqueous solution of a sodium salt of sulfuric acid esters of highly polymeric xylan having a $Z\eta$ value of about 0.031 to 0.034 and an ester sulfur content of about 17.5% to 19.5% in an acidified aqueous solution of hydrogen peroxide to depolymerize such highly polymeric xylan ester partially and saponify such highly polymeric xylan ester salt partially, dialyzing the depolymerized product in an aqueous medium to remove the fractions of lower molecular weight and fractionating an aqueous solution of the dialyzate with a water miscible organic solvent to obtain a fraction having a $Z\eta$ value between 0.0030 and 0.015 and a sulfur content of 13.5% to 17%.

References Cited in the file of this patent

UNITED STATES PATENTS

| Number | Name | Date |
|---|---|---|
| 2,076,889 | Hees | Apr. 13, 1937 |

FOREIGN PATENTS

| Number | Country | Date |
|---|---|---|
| 603,571 | Great Britain | June 18, 1948 |

OTHER REFERENCES

Von Kaulla et al., Chem. Abstracts, 44 3914g (1950).